United States Patent
Needham et al.

(10) Patent No.: US 9,990,044 B2
(45) Date of Patent: Jun. 5, 2018

(54) GAZE TRACKING SYSTEM

(71) Applicant: Intel Corporation, Santa Clara, CA (US)

(72) Inventors: Bradford H. Needham, North Plains, OR (US); Douglas Bogia, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 14/928,531

(22) Filed: Oct. 30, 2015

(65) Prior Publication Data
US 2017/0123500 A1 May 4, 2017

(51) Int. Cl.
G06F 3/01 (2006.01)
G06K 9/00 (2006.01)

(52) U.S. Cl.
CPC ......... G06F 3/017 (2013.01); G06K 9/00604 (2013.01)

(58) Field of Classification Search
None
See application file for complete search history.

(56) References Cited

U.S. PATENT DOCUMENTS

| | | | | |
|---|---|---|---|---|
| 2007/0211071 A1* | 9/2007 | Slotznick | .......... | G06F 17/30899 345/594 |
| 2012/0254736 A1* | 10/2012 | Levien | .................. | H04W 4/18 715/249 |
| 2013/0074036 A1* | 3/2013 | Brandt | ...................... | G06F 8/33 717/113 |
| 2013/0304479 A1* | 11/2013 | Teller | ..................... | G06F 3/013 704/275 |
| 2014/0337740 A1* | 11/2014 | Kwon | ................. | G06F 3/04817 715/728 |
| 2015/0095844 A1* | 4/2015 | Cho | ....................... | G06F 3/0485 715/784 |
| 2015/0143234 A1* | 5/2015 | Norris, III | ............. | G06F 17/24 715/256 |
| 2015/0309569 A1* | 10/2015 | Kohlhoff | ................ | G06F 3/013 345/156 |
| 2015/0338914 A1* | 11/2015 | Andrysco | ............... | G06F 3/041 345/173 |
| 2016/0042554 A1* | 2/2016 | Ogan | ................. | G02B 27/2278 345/419 |
| 2016/0139762 A1* | 5/2016 | Meir | ...................... | G06F 3/005 345/156 |

OTHER PUBLICATIONS

Sena Devide, John Vijay, et al., "Jazz Sangam: A Real-Time Tool for Distributed Pair Programming on a Team Development Platform", (2008), 4 pgs.

* cited by examiner

Primary Examiner — Christopher Kohlman
(74) Attorney, Agent, or Firm — Schwegman Lundberg & Woessner, P.A.

(57) ABSTRACT

Various systems and methods for a gaze tracking system are described herein. A system for gaze tracking in a co-located workspace includes a user sensing module to identify a user proximate to the system; a gaze tracking module to track a gaze of the user; and a presentation module to draw a highlighted area on a display of the system, the highlighted area corresponding to the gaze of the user.

26 Claims, 9 Drawing Sheets

GAZE TRACKING SYSTEM

TECHNICAL FIELD

Embodiments described herein generally relate to visual tracking systems and in particular, to a gaze tracking system.

BACKGROUND

In some organizations, office sharing or co-location provides easier collaboration between two or more people. In computer programming, pair programming (sometimes referred to as peer programming) is where two or more programmers work together at one workstation. Typically, one programmer acts as the primary editor, sometimes referred as the driver, and the other programmer acts as the secondary editor, sometimes referred as the observer, pointer, or navigator. The secondary editor acts with a broader view of the process and may focus on the strategic direction of the work while the primary editor acts with a narrower view of the process and focuses on the implementation of the current task. Working together, the driver and observer may work more efficiently and produce better results than if each worked on separate projects individually.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a gaze tracking system used in collaborative editing. One example of collaborative editing is pair programming or peer programming Other examples of collaborative editing include, but are not limited to drafting legal documents, drafting newspaper articles, drafting novels or short stories, or the like.

In collaborative editing there are recognized roles: the primary editor and one or more secondary editors. The primary editor is tasked with operating the input controls (e.g., the mouse and keyboard) and is consequently tasked with drafting the actual document, code, or project. The secondary editor is tasked with providing support to the primary editor, such as by offering suggestions or ideas, pointing out errors, critiquing the work, or thinking about other aspects of the project. The primary editor may be referred to as the "driver." The secondary editor may be referred to as the "observer," "pointer," "navigator," or "non-driver." Other terms may be used to refer to these roles. Also, people may change roles while working.

In typical collaborative editing, two or more people sit side-by-side looking at the same display arrangement. The display arrangement may include one or more screens (e.g., a multi-monitor setup). However, a limitation in collaborative editing is that there is typically only one set of input devices (e.g., a mouse and a keyboard), or the inputs are only effectively useable by one person at a time. Part of this is by design to allow the secondary editor to perform his role without multi-tasking as the primary editor—and vice versa.

Figure 1:
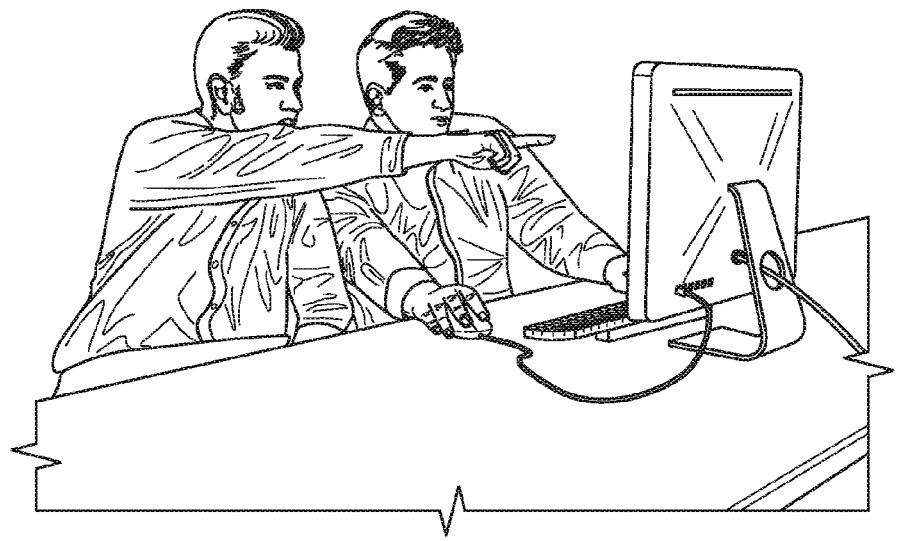
FIG. 1 is a diagram illustrating an operating environment, according to an embodiment.

While the primary editor is working, the secondary editor may want to provide a suggestion or point out an error on the screen. However, with a single set of input devices, the secondary editor may have difficulty efficiently pointing out the exact portion of the display arrangement that he is referring to, as illustrated in FIG. 1. The secondary editor may have to reach and stretch uncomfortably to point to a portion of a screen. The pointing or gesturing may distract or annoy the primary editor because the secondary editor is too close (e.g., invading the primary editor's personal space), touching the screen, obscuring the screen with an arm, or otherwise impeding the primary editor.

The non-driver, co-located collaboration happens in many situations, even when the secondary editor is capable of controlling the input, for example, by touching a touchscreen input. Two people may be trying to decide which movie to see. One holds a tablet and the other looks on to offer comments, such as "look at the reviews for that one." For social reasons, the secondary editor suggests actions for the primary editor rather than taking over the touchscreen. As another example, an instructor may lean over or sit next to a student while the student works. For instructional reasons, the instructor offers suggestions rather than taking control of the student's system. As yet another example, a physician may review a patient record with a patient. The patient record may be an x-ray scan, for example, and be displayed on a screen. To ensure that the patient is paying attention to the aspects of the scan that the physician is discussing and following along, the physician may ask the patient to periodically point to or describe the section of the scan being discussed.

What is needed is a system that provides a way for the secondary editor to indicate the area of interest to the primary editor. Unique challenges arise in a co-located context that do not exist when each editor has their own input devices. Collaboration with distributed systems, where each user has his own system, is generally referred as computer supported collaborative work (CSCW). In a co-located context, the physical constraints and limited input and output devices create its own issues, which are addressed by systems and methods described herein.

Figure 2:
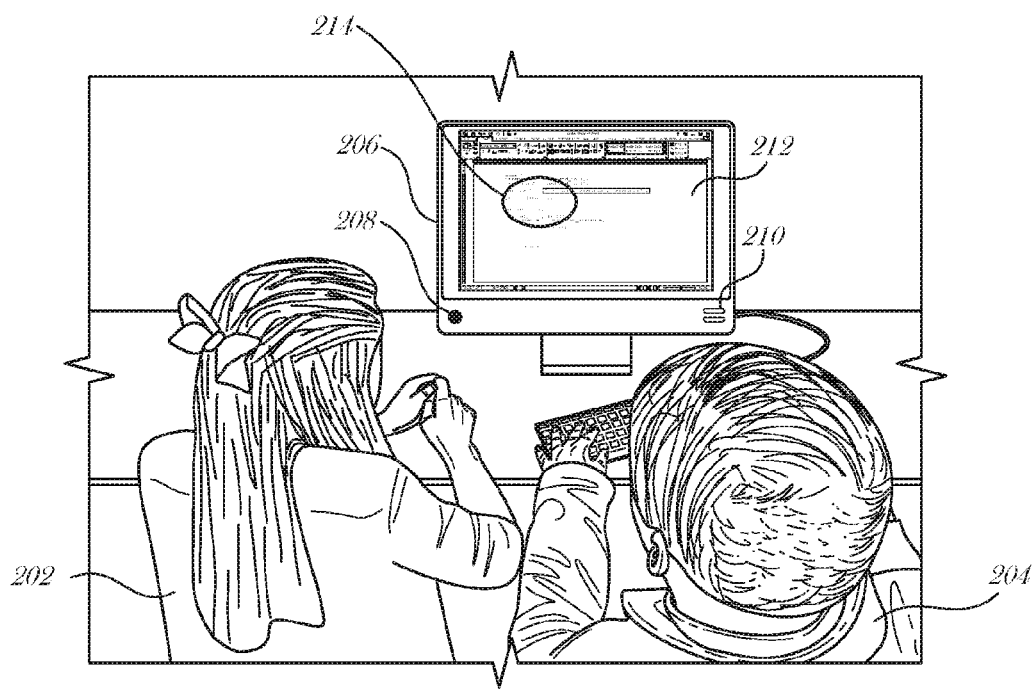
FIG. 2 is a diagram illustrating an operating environment, according to an embodiment.

FIG. 2 is a diagram illustrating an operating environment 200, according to an embodiment. The operating environment 200 includes two users 202 and 204, where user 204 is acting as the primary editor or driver, and user 202 is acting as the secondary editor or observer. The users 202 and 204 are working at a computer workstation 206. In the example illustrated in FIG. 2, the computer workstation 206 is a desktop computer with a single screen. It is understood that the computer workstation 206 may be any form factor, such as a laptop, hybrid computer, tablet, phablet, smartphone, television, in-vehicle infotainment system, vending machine, kiosk, in-store digital signage, or other compute device having one or more screens.

The computer workstation 206 includes a sensor 208 to determine where the secondary editor (e.g., non-driver) is looking. In the example illustrated in FIG. 2, the sensor 208 may track the gaze of user 206. The sensor 208 may be one or more cameras. The cameras may be two-dimensional, three-dimensional, or infrared and be coupled to image processing software to process images captured by the sensor 208. The sensor 208 may optionally track the gaze of the driver (e.g., primary editor), who is user 204 in this example.

The sensor 208 may also be used to detect and track gestures of one or both of the users 202 and 204. Gesture tracking may be used to corroborate where a person is looking or focusing. Gesture tracking may also be used to determine who is acting as the driver. Gestures may be head gestures (e.g., nodding or pointing to an area with their nose), hand/arm gestures, or the like.

The sensor 208 may also include a LIDAR, micro radar, or a non-optical mechanism to track gestures or gaze. The sensor 208 may use facial detection and recognition to track a person's gaze or facial gestures.

The computer workstation 206 may also include a microphone 210. Using the microphone 210 alone or with image processing of the images captured by the sensor 208, it may be determined who is talking or providing other utterances.

The computer workstation 206 includes a display 212, which may be presenting one or more documents or other work product. Based on the data from the sensor 208 and the microphone 210, the computer workstation 206 may infer who is acting as the non-driver, where on the display 212 the non-driver is looking, and then highlight the portion of the display 212 where the non-driver is looking. In an embodiment, the computer workstation 206 presents a highlight circle 214 on the display 212 to provide an indication to the driver where the non-driver is looking. The highlighting may be any type of visual indicia, such as a highlighted circle, a unique cursor, a magnified portion of the display, an outline of the area, highlighted text, or the like.

Optionally, the highlighting may be shown only when the secondary editor (non-driver) is speaking. Optionally, the computer workstation 206 may determine the semantics of what is being displayed and highlight the semantic units that the non-driver is looking at. For example, if two developers are writing code, the non-driver developer may be looking at a portion of the code and the computer system may highlight one or more lines of code around the area where the non-driver developer is looking.

Highlights may be application-specific and constrained to the application. For example, highlighting may be used for code development, so the highlighting may be provided in windows that are used in the application integrated development environment, but absent in a window used for email. Alternatively, highlighting may be provided at an operating system level, in which case the highlighting may be overlaid across several applications, screens, documents, or monitors. The highlighting may be implemented as part of the event-driven system, where the event is a gaze change that provides coordinates into the user interface controller, which then draws a cursor, highlight, outline box, magnified area, or other visual indicator at or around the coordinates. Integrating the highlighting into the event-driven system provides an easy way for any developer to create applications that provide non-driver highlighting capabilities.

Highlighting may be used for the primary editor/driver independent of highlighting for the secondary editor/non-driver, or in addition to highlighting for the secondary editor/non-driver. The primary and secondary editors' highlighting may be presented differently to avoid confusion. For example, the highlighting may be different colors, shapes, or the like.

To determine who the driver is, the computer workstation 206 may implement one or more techniques. In an example, a manual control is used to set the driver role. For example, a small window may appear on the display 212 with silhouettes of the users 202 and 204, with one of the silhouettes highlighted to indicate who is currently assigned as driver. Using an input device, such as a mouse, the user 202 may click on the silhouette corresponding to her position and in doing so instruct the computer workstation 206 that she is taking control as the driver. As another example of manual control, a user may speak a keyword to identify herself as the driver. Image analysis in combination with audio capture may identify the person who spoke and assign the driver role to that person.

In another example, the driver role may be assigned based on which user's face is closer to center of the display 212. There is a strong correlation between the users' positions and their roles. For example, when using a tablet, the user who is holding the system (e.g., driving) is typically also more centered on the tablet than other users who may be looking on. Thus, facial position may be used to infer roles.

In another example, the driver role may be determined using image analysis or other analysis to determine who is touching the keyboard, mouse, or other input device of the system.

In another example, the driver role may be determined based on sensor data, such as by using internal or external sensors (e.g., LIDAR, cameras, micro radar, etc.) to sense a 3D map of room and detect who is near/looking at the display and who holding/controlling the system.

Highlighting may be turned off using various mechanisms. For example, using a spoken keyword, the driver or the non-driver may toggle the use of highlighting for either the driver or non-driver.

Highlighting may be used simultaneously for both the driver and non-driver. For example, the computer workstation 206 may track gazes of both the driver and non-driver. When the gazes converge, then the computer workstation 206 may change highlighting to indicate the convergence. For example, the highlighting may become more subtle when both users are looking at same part of screen to avoid getting in the way when working on the same part. As another example, the highlighting may be smaller when both users are looking at different parts of the screen, but when their gazes converge, the highlighting may change properties (e.g., become larger, change colors, change transparency, etc.).

Gesture, gaze, head pose, and other factors may be fused to control the highlighting. For example, highlighting may be active only when the non-driver is gesturing and their head is turned toward the screen, or highlighting the non-driver's gaze target only when they are pointing a finger or arm in the direction of the screen.

As another example of highlighting modifications, the computer workstation 206 may optionally change the form of non-driver highlighting based on where the driver is looking. For example, the computer workstation 206 may use stronger highlighting of a larger area when the driver's gaze target is further from the non-driver's gaze target; thus attracting the driver's gaze to the highlighted portion.

Figure 3:
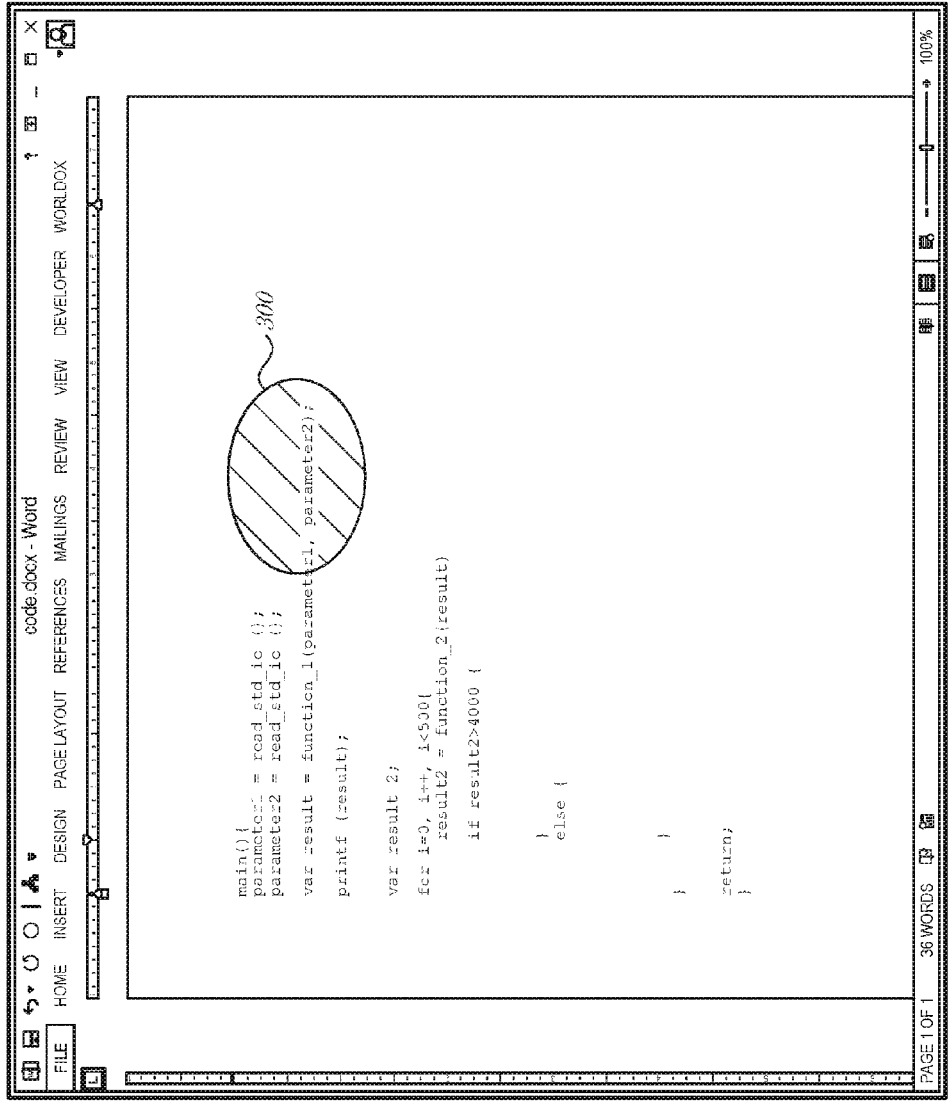
FIGS. 3-7 illustrate highlighting modifications in various embodiments.
Figure 4:
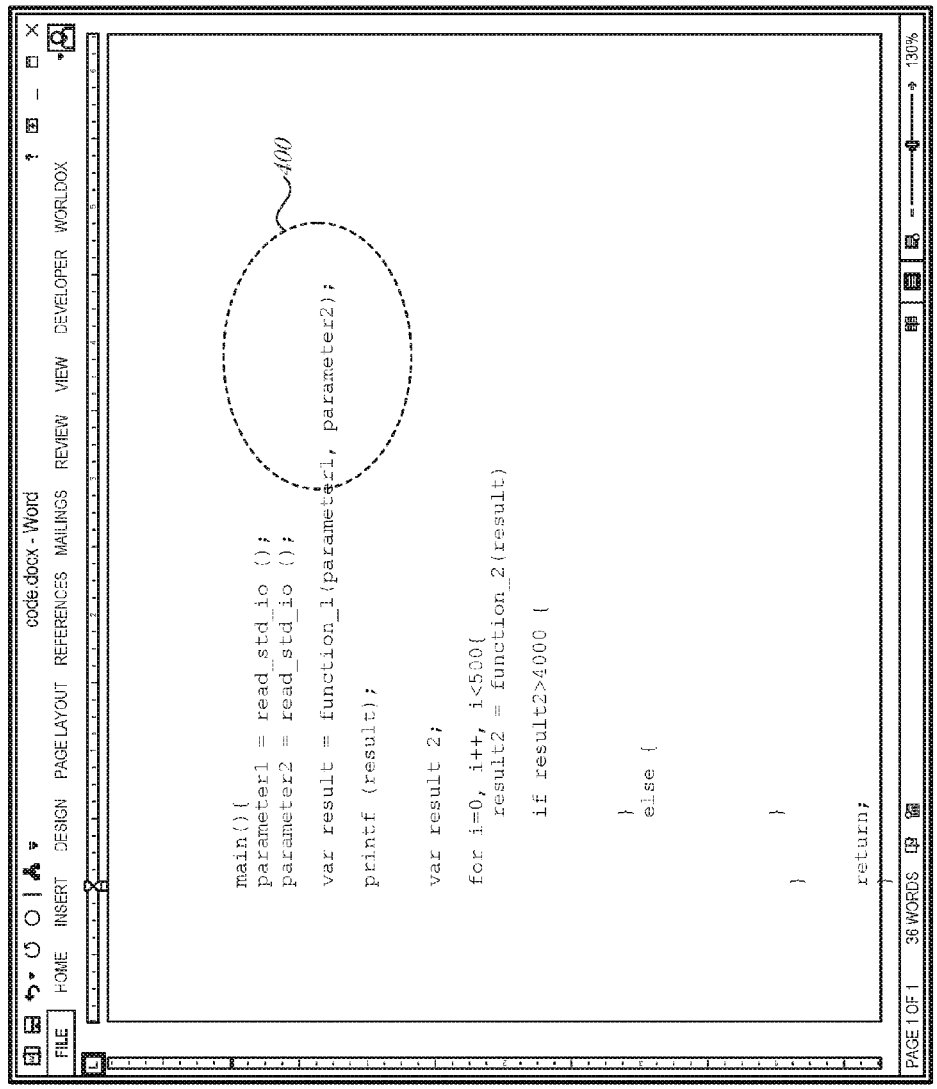
Figure 5:
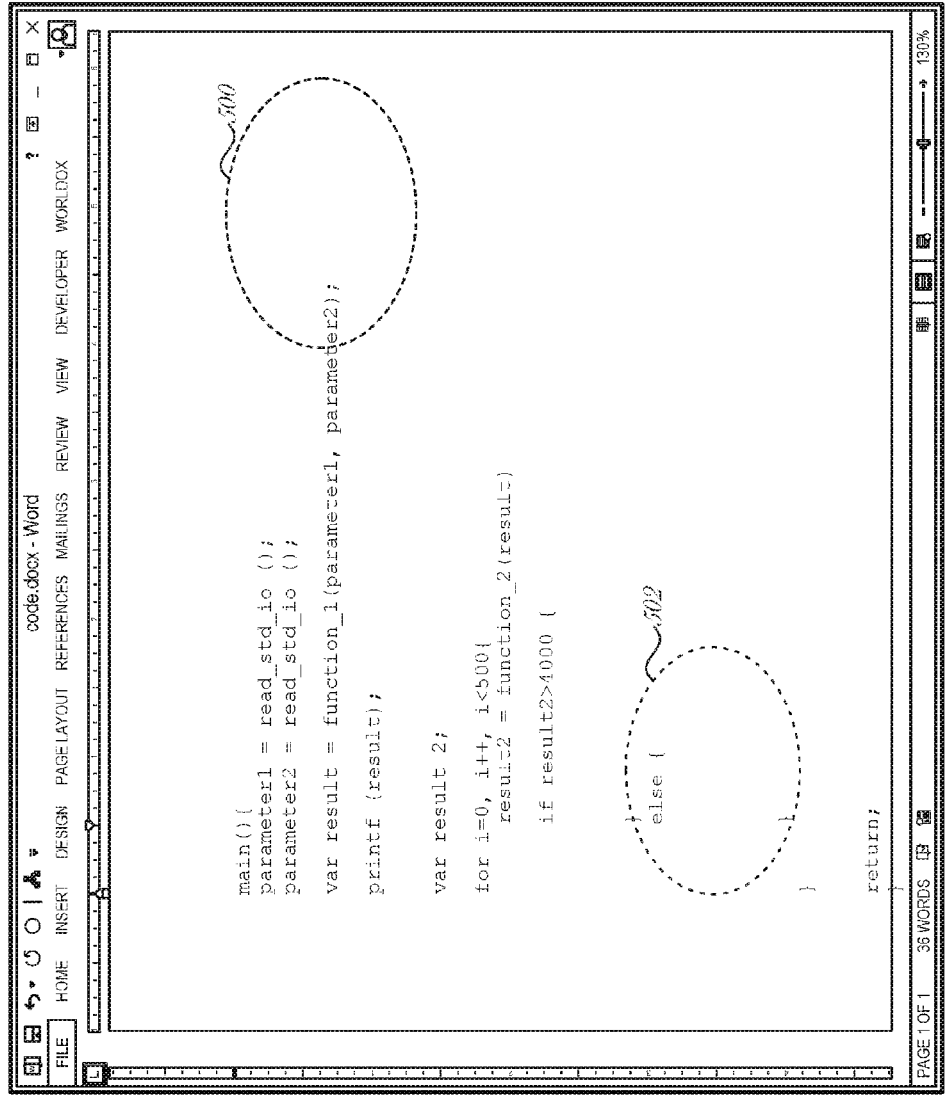
Figure 6:
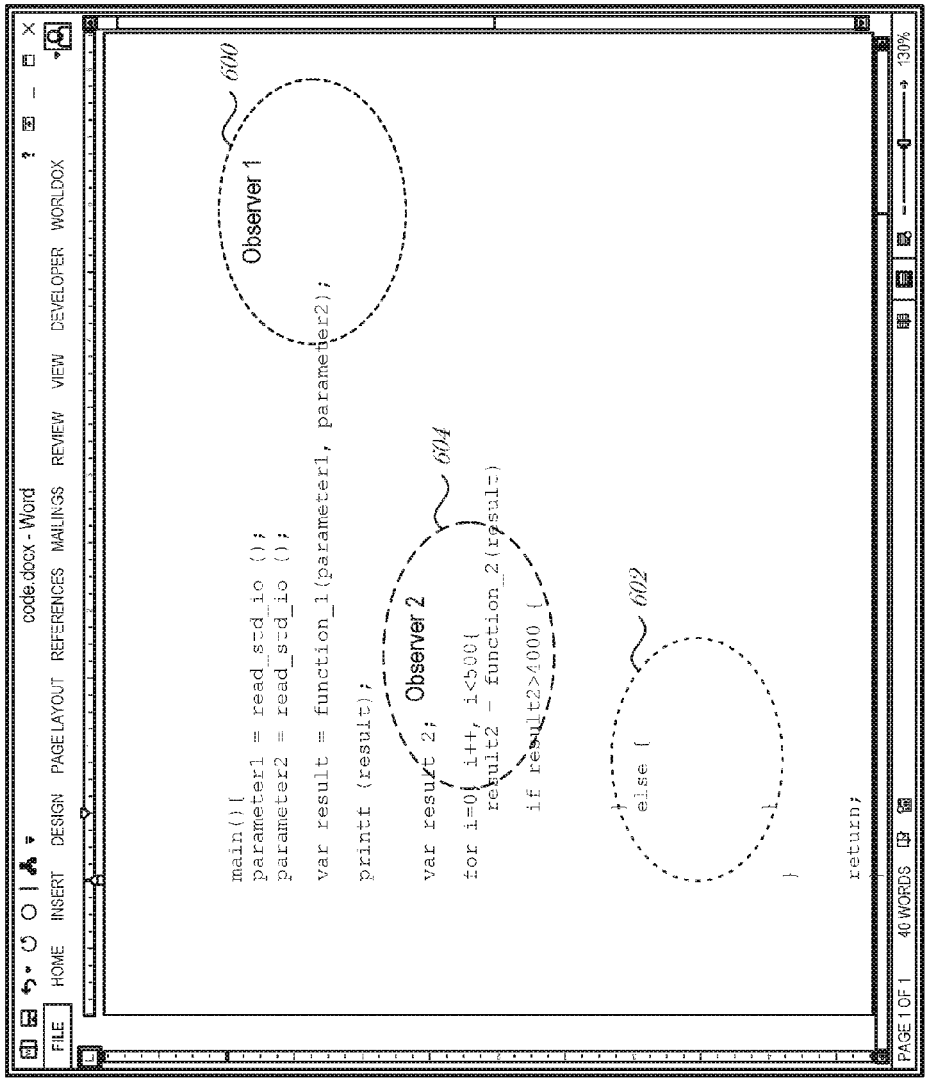
Figure 7:
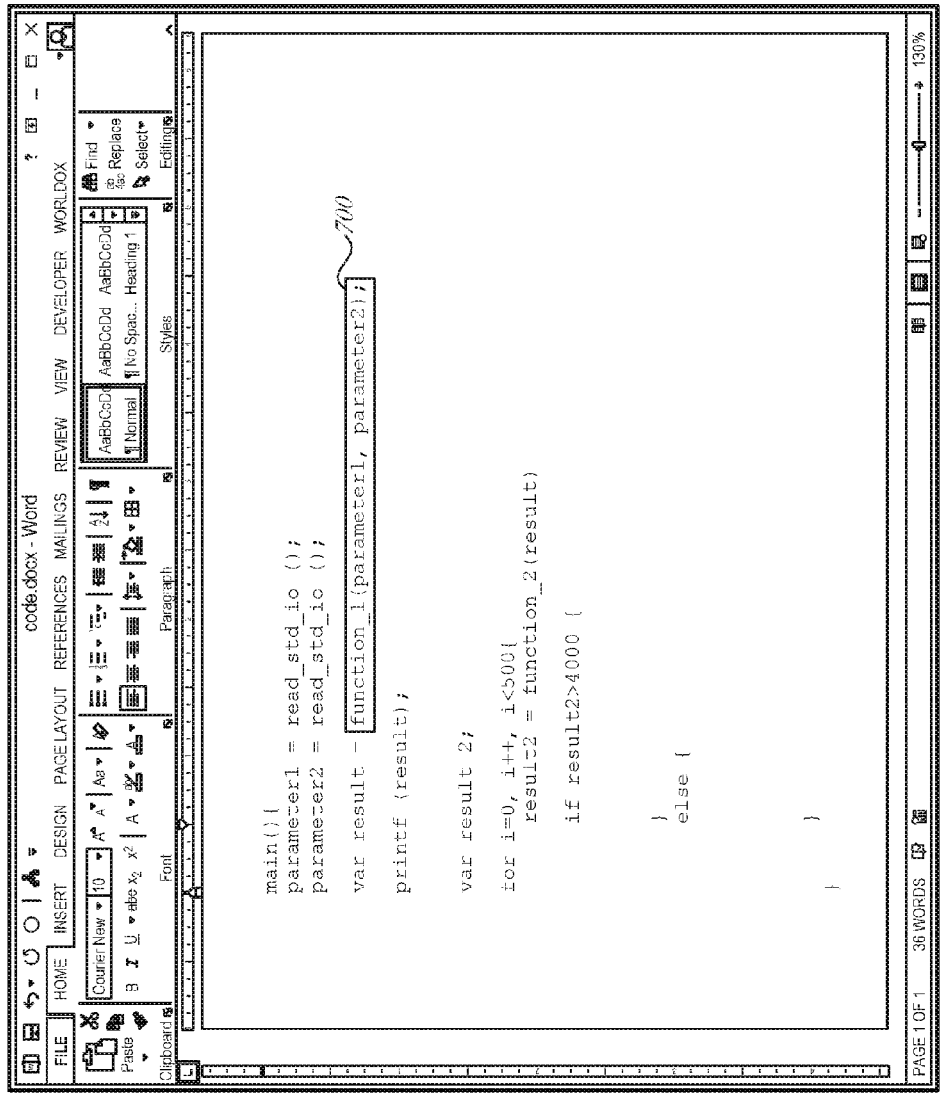

FIGS. 3-7 illustrate highlighting modifications in various embodiments. FIG. 3 illustrates a highlighted area 300, which may be a shape having a different color, brightness, or accent than the rest of the displayed area. The highlighted area 300 indicates where the secondary editor is looking based on the gaze detection of the secondary editor. FIG. 4 illustrates a similar highlighted area 400 that is accented using an oval with a dashed line. FIG. 5 illustrates a first highlighted area 500 arranged where the secondary editor is looking and a second highlighted area 502 arranged where the primary editor is looking. In FIG. 6, the highlighted areas 600, 602, and 604 are used to indicate where a first secondary editor is looking (area 600), a second secondary editor is looking (area 604), and where the primary editor is looking (area 602). It is understood that any shape, line, color, shading, transparency, or other visual effects may be used when drawing the highlighted areas. FIG. 7 illustrates a semantic highlighted area 700 based on where the secondary editor is looking. The semantic highlighted area 700 includes the full function call with parameters. The amount of text and the text actually highlighted is based on semantic understanding of the document's content.

Figure 8:
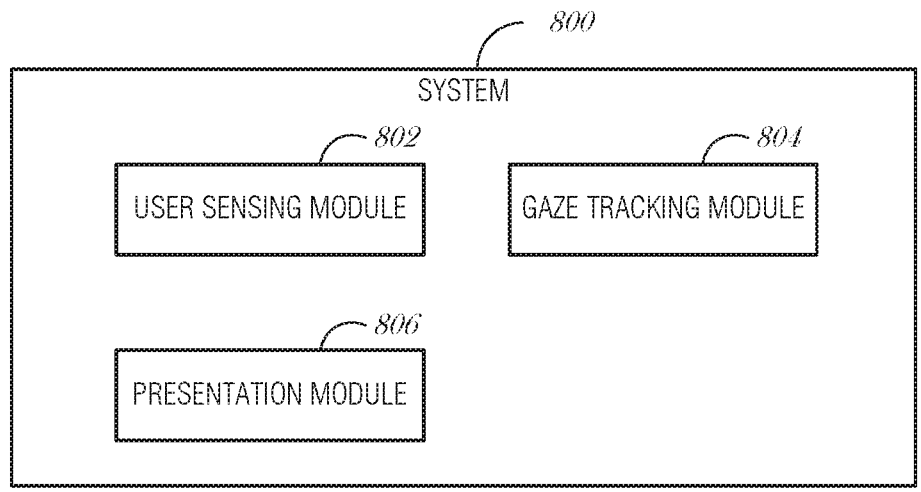
FIG. 8 is a block diagram illustrating a system for gaze tracking in a co-located workspace, according to an embodiment.

FIG. 8 is a block diagram illustrating a system 800 for gaze tracking in a co-located workspace, according to an embodiment. The system 800 may include a user sensing module 802, a gaze tracking module 804, and a presentation module 806. The user sensing module 802 may be configured to identify a user proximate to the system 800. The system 800 may be any type of device including, but not limited to a laptop, hybrid computer, tablet, phablet, smartphone, television, in-vehicle infotainment system, vending machine, kiosk, in-store digital signage, or other compute device having one or more screens. In an embodiment, the system 800 comprises a desktop computer. In an embodiment, the system 800 comprises a mobile computer.

In an embodiment, the user proximate to the system is one of several people proximate to the user device. For example, the user may be one of several people using the system 800 in a pair programming environment. In an embodiment, the user proximate to the system is acting in an observer role of the system, where the observer role is not actively controlling the system 800. In an embodiment, the user proximate to the system is acting in a driver role of the system.

In an embodiment, to identify the user proximate to the system 800, the user sensing module 802 is to capture an image of the system and a plurality of people proximate to the system and analyze the image to identify the user. In addition to using image analysis, gesture analysis may be used. For example, a secondary editor may use her arm or hand to point toward the display. This action may be used in combination with image analysis that indicates that she is also looking at the display. Thus, in a further embodiment, to analyze the image to identify the user, the user sensing module 802 is to analyze a gesture or posture of the plurality of people proximate to the system and based on the gesture or posture, identify the user.

The gesture may be used to indicate a particular role, for example, a user designated gesture may be used to indicate that one is acting in either the driver or observer role. Thus, in a further embodiment, the gesture or posture indicates that the user is holding or controlling the system, and to identify the user the user sensing module 802 is to identify the user as a driver. In another embodiment, the gesture or posture indicates that the user is looking at the system 800, and to identify the user the user sensing module 802 is to identify the user as an observer.

In an embodiment, to analyze the image to identify the user, the user sensing module 802 is to determine which person of a plurality of people have their face closest to the display and identify the user as the person associated with the closest face. Based on the form factor (e.g., a tablet computer), the driver may be closer to the display in most cases, resulting in a strong inference that the closer person is acting as the driver.

In a further embodiment, to identify the user proximate to the system 800, the user sensing module 802 is to use posture or sound analysis to corroborate the identification of the user. For example, the observer may point to the display, strengthening the inference that the person is the observer. Alternatively, the driver or the observer may use a gesture or voice command to set their role. For example, the person who wishes to act as the driver may take control of the input devices and then state "Set me as driver." Other people in proximity to the system 800 may be set to observers then by default. Thus, in an embodiment, the user is assigned the role of driver based on facial position and/or posture or sound analysis.

In an embodiment, to identify the user proximate to the system 800, the user sensing module 802 is to receive user input to set the user whose gaze is to be highlighted. For example, the driver may want her gaze to be highlighted and have the observer's gaze not highlighted. As another example, the gaze of one or more of the people around the system 800 may toggle the highlighting of their respective gazes on and off using some command (e.g., a mouse command, a keyboard command, a touchscreen gesture command, a voice command, a gesture command, or the like).

In an embodiment, to identify the user proximate to the system, the user sensing module 802 is to analyze gestures of the user. In such an embodiment, the gestures may be used separately and exclusively from image analysis, voice analysis, or other techniques to identify users.

In an embodiment, to identify the user proximate to the system 800, the user sensing module 802 is to perform sound analysis to identify the user. In such an embodiment, voice analysis may be used separately and exclusively from image analysis, gesture analysis, or other techniques to identify users.

The gaze tracking module 804 may be configured to track a gaze of the user. In an embodiment, to track the gaze of the user, the gaze tracking module 804 is to capture a representation of the user and analyze the representation to determine the gaze of the user. Various cameras may be used including, but not limited to optical cameras, infrared cameras, LIDAR, depth cameras, and the like. Thus, in a further embodiment, the representation is an optical image and the gaze tracking module 804 is to analyze the representation comprise instructions to implement facial analysis to determine the gaze of the user. In another embodiment, the representation is a three-dimensional representation and the gaze tracking module 804 is to analyze the representation comprise instructions to implement morphologic analysis to determine the gaze of the user. Morphologic analysis may be performed on a 3D representation of the user, for example.

The presentation module 806 may be configured to draw a highlighted area on a display of the system 800, the highlighted area corresponding to the gaze of the user. In an embodiment, to draw the highlighted area on the display corresponding to the gaze of the user, the presentation module 806 is to draw a shape on the display and periodically redraw the shape to track the gaze of the user. The redraw may be relatively short, such as every 10 milliseconds, or relatively long, such as once per second. In a further embodiment, to draw the shape, the presentation module 806 is to draw the shape with a fill and a transparency. The fill may be any type of pattern, color, or transparency. The fill may use a solid color or a gradient fill. The fill may be unique to a driver or observer. For example, with multiple observers, each observer may be associated with a particular fill pattern or color to distinguish each observer's gaze. Similarly, for multiple drivers, the fill may be altered to distinguish between the drivers. In a multi-driver environment, each driver may have their own set of input devices (e.g., each has a keyboard and mouse that work on a single shared display). Using gaze tracking allows one driver/observer to quickly ascertain the point of attention of the other driver/observer.

In an embodiment, to draw the shape, the presentation module 806 is to draw an outline of the shape. The shape may be any shape including, but not limited to an oval, a circle, an arrow, a star, a rectangle, an octagon, an irregular shape, or the like. In a further embodiment, the outline of the shape comprises a dashed line. Different dash patterns and/or shapes may be used to distinguish observers from drivers, or one observer from another observer, or one driver from another driver.

In an embodiment, to draw the highlighted area on the display corresponding to the gaze of the user, the presentation module 806 is to highlight a portion of text being displayed on the display. In a further embodiment, the portion of text is highlighted based on semantic analysis of the text being displayed on the display. For example, a paragraph, a code block, or a graphical element may be highlighted depending on the type of document being edited or viewed. The document type may be obtained from document metadata. Then using the document metadata, the semantic highlighting may be configured.

In an embodiment, to draw the highlighted area on the display corresponding to the gaze of the user, the presentation module 806 is to magnify the highlighted area. The magnification may be slight, such as a 5% magnification so as to not be too distracting to the primary editor.

In an embodiment, to draw the highlighted area on the display corresponding to the gaze of the user, the presentation module 806 is to draw a cursor corresponding to the highlighted area. The cursor may be of any type including a hand cursor, a pointer cursor, an insertion cursor, or some other arbitrary shaped cursor.

In an embodiment, to draw the highlighted area on the display corresponding to the gaze of the user, the presentation module 806 is to conditionally activate the highlighted area based on a gesture or voice command of the user. Highlighting may be toggled by the driver or by the person whose gaze is being highlighted. Highlighting may be conditionally activated based on a gesture or some other indicia so that the highlights are not constantly shown, but only shown when the person wants to draw attention to something. For example, an observer may be casually observing the input of text in a code block. But at a point when she wants to ask a question or provide a suggestion, she may gesture toward the display. In response to the gesture, the system 800 may identify the location of her gaze and present the highlighting (either semantically or in an area highlight).

Figure 9:
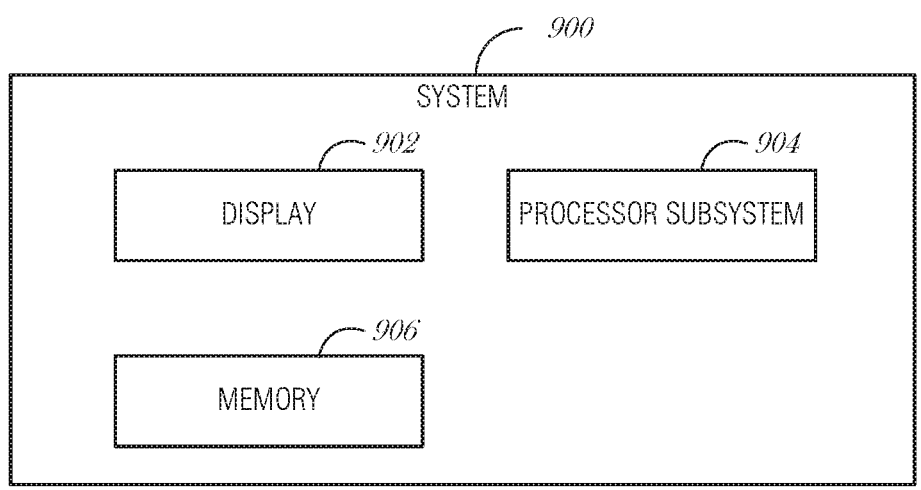
FIG. 9 is a block diagram illustrating a system for gaze tracking in a co-located workspace, according to an embodiment.

FIG. 9 is a block diagram illustrating a system 900 for gaze tracking in a co-located workspace, according to an embodiment. The system 900 may include a display 902, a processor subsystem 904, and a memory 906. The memory 906 may include instructions, which when executed by the processor subsystem 904, cause the processor subsystem 904 to identify a user proximate to the system; track a gaze of the user; and draw a highlighted area on the display, the highlighted area corresponding to the gaze of the user. The processor subsystem 904 may include one or more processors, each with one or more cores. Additionally, the processor subsystem 904 may be disposed on one or more physical devices.

In an embodiment, the system 900 comprises a desktop computer. In an embodiment, the system 900 comprises a mobile computer. It is understood that the system 900 may be any type of compute device, as described in this document.

In an embodiment, the user proximate to the system is one of several people proximate to the user device. In an embodiment, the user proximate to the system is acting in an observer role of the system, where the observer role is not actively controlling the system. In an embodiment, the user proximate to the system is acting in a driver role of the system.

In an embodiment, the instructions to identify the user proximate to the system include instructions to capture an image of the system and a plurality of people proximate to the system; and analyze the image to identify the user. In a further embodiment, the instructions to analyze the image to identify the user include instructions to analyze a gesture or posture of the plurality of people proximate to the system; and based on the gesture or posture, identify the user. In a further embodiment, the gesture or posture indicates that the user is holding or controlling the system, and the instructions to identify the user include instructions to identify the user as a driver. In a further embodiment, the gesture or posture indicates that the user is looking at the system, and the instructions to identify the user include instructions to identify the user as an observer.

In an embodiment, the instructions to analyze the image to identify the user include instructions to determine which person of a plurality of people have their face closest to the display; and identify the user as the person associated with the closest face. In a further embodiment, the instructions to identify the user proximate to the system include instructions to use posture or sound analysis to corroborate the identification of the user. In an embodiment, the user is assigned the role of driver based on facial position and/or posture or sound analysis.

In an embodiment, the instructions to identify the user proximate to the system include instructions to receive user input to set the user whose gaze is to be highlighted.

In an embodiment, the instructions to identify the user proximate to the system include instructions to analyze gestures of the user.

In an embodiment, the instructions to identify the user proximate to the system include instructions to perform sound analysis to identify the user.

In an embodiment, the instructions to track the gaze of the user include instructions to: capture a representation of the user; and analyze the representation to determine the gaze of the user. In a further embodiment, the representation is an optical image and the instructions to analyze the representation include instructions to implement facial analysis to determine the gaze of the user. In a further embodiment, the representation is a three-dimensional representation and the instructions to analyze the representation include instructions to implement morphologic analysis to determine the gaze of the user.

In an embodiment, the instructions to draw the highlighted area on the display corresponding to the gaze of the user include instructions to draw a shape on the display; and periodically redraw the shape to track the gaze of the user. In a further embodiment, the instructions to draw the shape include instructions to draw the shape with a fill and a transparency. In a further embodiment, the instructions to draw the shape include instructions to draw an outline of the shape. In a further embodiment, the outline of the shape comprises a dashed line.

In an embodiment, the instructions to draw the highlighted area on the display corresponding to the gaze of the user include instructions to highlight a portion of text being displayed on the display. In an embodiment, the portion of text is highlighted based on semantic analysis of the text being displayed on the display.

In an embodiment, the instructions to draw the highlighted area on the display corresponding to the gaze of the user include instructions to magnify the highlighted area.

In an embodiment, the instructions to draw the highlighted area on the display corresponding to the gaze of the user include instructions to draw a cursor corresponding to the highlighted area.

In an embodiment, the instructions to draw the highlighted area on the display corresponding to the gaze of the user include instructions to conditionally activate the highlighted area based on a gesture or voice command of the user. In a further embodiment, the gesture comprises a pointing motion toward the display by the user.

Figure 10:
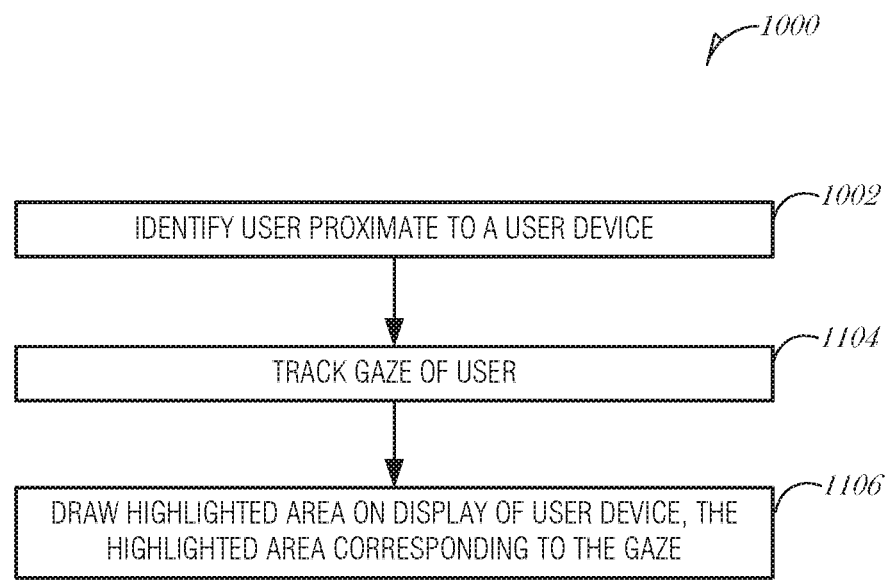
FIG. 10 is a flowchart illustrating a method of gaze tracking in a co-located workspace, according to an embodiment.

FIG. 10 is a flowchart illustrating a method 1000 of gaze tracking in a co-located workspace, according to an embodiment. At block 1002, a user proximate to a user device is identified by the user device. In an embodiment, the user device comprises a desktop computer. In an embodiment, the user device comprises a mobile computer.

In an embodiment, the user proximate to the user device is one of several people proximate to the user device. In an embodiment, the user proximate to the user device is acting in an observer role of the user device, where the observer role is not actively controlling the user device. In an embodiment, the user proximate to the user device is acting in a driver role of the user device.

In an embodiment, identifying the user proximate to the user device comprises capturing an image of the user device and a plurality of people proximate to the user device; and analyzing the image to identify the user. In a further embodiment, analyzing the image to identify the user comprises: analyzing a gesture or posture of the plurality of people proximate to the user device; and based on the gesture or posture, identifying the user. In another embodiment, the gesture or posture indicates that the user is holding or controlling the user device, and wherein identifying the user comprises identifying the user as a driver. In another embodiment, the gesture or posture indicates that the user is looking at the user device, and wherein identifying the user comprises identifying the user as an observer.

In an embodiment, analyzing the image to identify the user comprises: determining which person of a plurality of people have their face closest to the display of the user device; and identifying the user as the person associated with the closest face. In a further embodiment, identifying the user proximate to the user device comprises using posture or sound analysis to corroborate the identification of the user. In an embodiment, the user is assigned the role of driver based on facial position and/or posture or sound analysis.

In an embodiment, identifying the user proximate to the user device comprises receiving user input to set the user whose gaze is to be highlighted.

In an embodiment, identifying the user proximate to the user device comprises analyzing gestures of the user.

In an embodiment, identifying the user proximate to the user device comprises performing sound analysis to identify the user.

At block 1004, a gaze of the user is tracked. In an embodiment, tracking the gaze of the user comprises capturing a representation of the user and analyzing the representation to determine the gaze of the user. In a further embodiment, the representation is an optical image and wherein analyzing the representation comprises implementing facial analysis to determine the gaze of the user. In another embodiment, the representation is a three-dimensional representation and wherein analyzing the representation comprises implementing morphologic analysis to determine the gaze of the user.

At block 1006, a highlighted area is drawn on a display of the user device, the highlighted area corresponding to the gaze of the user. In an embodiment, drawing the highlighted area on the display of the user device corresponding to the gaze of the user comprises drawing a shape on the display of the user device and periodically redrawing the shape to track the gaze of the user. In a further embodiment, drawing the shape comprises drawing the shape with a fill and a transparency. In a further embodiment, drawing the shape comprises drawing an outline of the shape. In a further embodiment, the outline of the shape comprises a dashed line.

In an embodiment, drawing the highlighted area on the display of the user device corresponding to the gaze of the user comprises highlighting a portion of text being displayed on the display. In a further embodiment, the portion of text is highlighted based on semantic analysis of the text being displayed on the display.

In an embodiment, drawing the highlighted area on the display of the user device corresponding to the gaze of the user comprises magnifying the highlighted area.

In an embodiment, drawing the highlighted area on the display corresponding to the gaze of the user comprises drawing a cursor corresponding to the highlighted area.

In an embodiment, drawing the highlighted area on the display of the user device corresponding to the gaze of the user comprises conditionally activating the highlighted area based on a gesture or voice command of the user. In a further embodiment, the gesture comprises a pointing motion toward the display by the user.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 11:
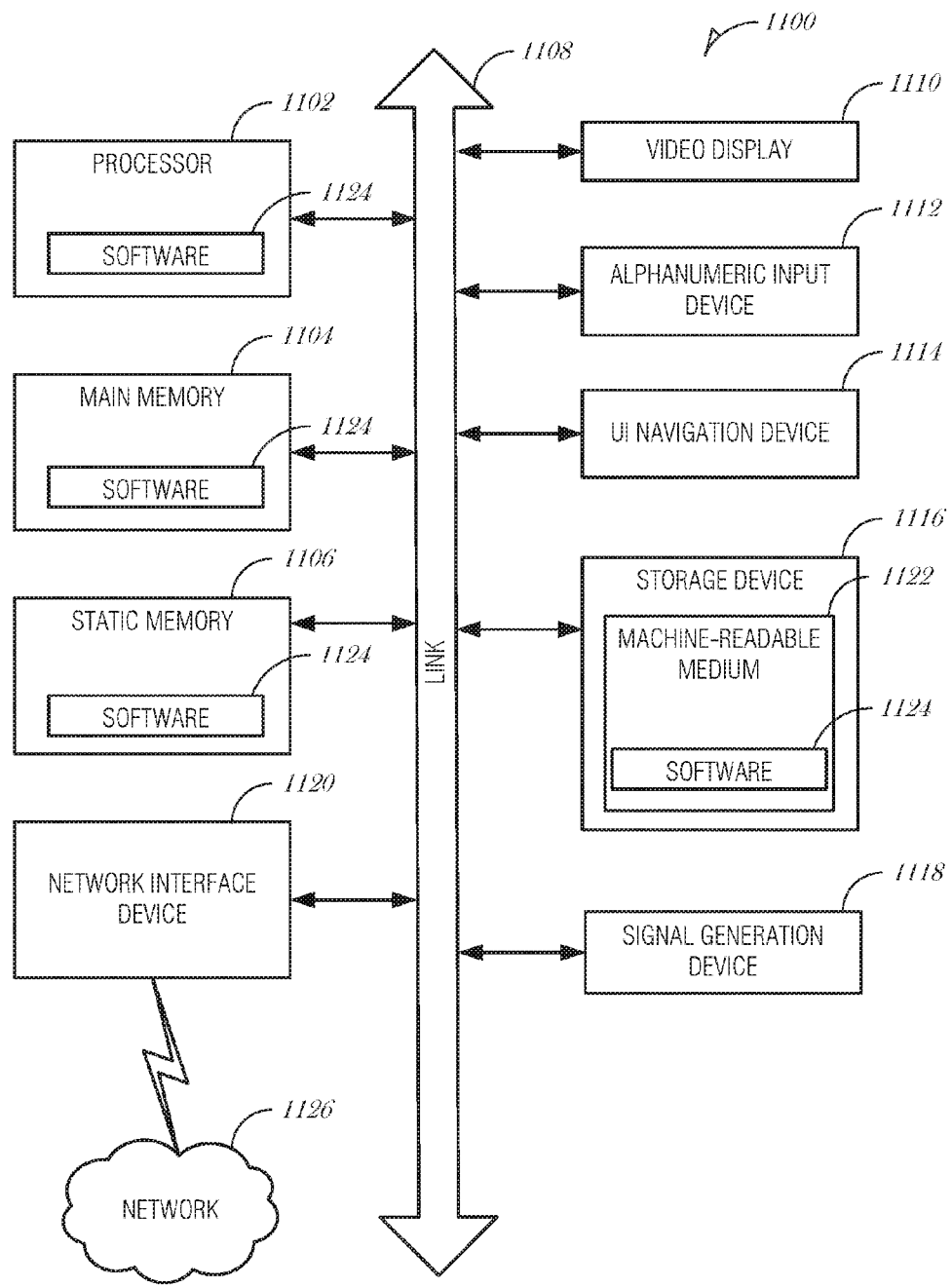
FIG. 11 is a block diagram illustrating an example machine upon which any one or more of the techniques (e.g., methodologies) discussed herein may perform, according to an example embodiment.

FIG. 11 is a block diagram illustrating a machine in the example form of a computer system 1100, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1100 includes at least one processor 1102 (e.g., a central processing unit (CPU), a graphics processing unit (GPU) or both, processor cores, compute nodes, etc.), a main memory 1104 and a static memory 1106, which communicate with each other via a link 1108 (e.g., bus). The computer system 1100 may further include a video display unit 1110, an alphanumeric input device 1112 (e.g., a keyboard), and a user interface (UI) navigation device 1114 (e.g., a mouse). In one embodiment, the video display unit 1110, input device 1112 and UI navigation device 1114 are incorporated into a touch screen display. The computer system 1100 may additionally include a storage device 1116 (e.g., a drive unit), a signal generation device 1118 (e.g., a speaker), a network interface device 1120, and one or more sensors (not shown), such as a global positioning system (GPS) sensor, compass, accelerometer, or other sensor.

The storage device 1116 includes a machine-readable medium 1122 on which is stored one or more sets of data structures and instructions 1124 (e.g., software) embodying or utilized by any one or more of the methodologies or functions described herein. The instructions 1124 may also reside, completely or at least partially, within the main memory 1104, static memory 1106, and/or within the processor 1102 during execution thereof by the computer system 1100, with the main memory 1104, static memory 1106, and the processor 1102 also constituting machine-readable media.

While the machine-readable medium 1122 is illustrated in an example embodiment to be a single medium, the term "machine-readable medium" may include a single medium or multiple media (e.g., a centralized or distributed database, and/or associated caches and servers) that store the one or more instructions 1124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

ADDITIONAL NOTES & EXAMPLES

Example 1 is a system for gaze tracking in a co-located workspace, the system comprising: a user sensing module to identify a user proximate to the system; a gaze tracking module to track a gaze of the user; and a presentation module to draw a highlighted area on a display of the system, the highlighted area corresponding to the gaze of the user.

In Example 2, the subject matter of Example 1 optionally includes, wherein the system comprises a desktop computer.

In Example 3, the subject matter of any one or more of Examples 1-2 optionally include, wherein the system comprises a mobile computer.

In Example 4, the subject matter of any one or more of Examples 1-3 optionally include, wherein the user proximate to the system is one of several people proximate to the user device.

In Example 5, the subject matter of any one or more of Examples 1-4 optionally include, wherein the user proximate to the system is acting in an observer role of the system, where the observer role is not actively controlling the system.

In Example 6, the subject matter of any one or more of Examples 1-5 optionally include, wherein the user proximate to the system is acting in a driver role of the system.

In Example 7, the subject matter of any one or more of Examples 1-6 optionally include, wherein to identify the user proximate to the system, the user sensing module is to: capture an image of the system and a plurality of people proximate to the system; and analyze the image to identify the user.

In Example 8, the subject matter of Example 7 optionally includes, wherein to analyze the image to identify the user, the user sensing module is to: analyze a gesture or posture of the plurality of people proximate to the system; and based on the gesture or posture, identify the user.

In Example 9, the subject matter of Example 8 optionally includes, wherein the gesture or posture indicates that the user is holding or controlling the system, and wherein to identify the user, the user sensing module is to identify the user as a driver.

In Example 10, the subject matter of any one or more of Examples 8-9 optionally include, wherein the gesture or posture indicates that the user is looking at the system, and wherein to identify the user, the user sensing module is to identify the user as an observer.

In Example 11, the subject matter of any one or more of Examples 7-10 optionally include, wherein to analyze the image to identify the user, the user sensing module is to: determine which person of a plurality of people have their face closest to the display; and identify the user as the person associated with the closest face.

In Example 12, the subject matter of Example 11 optionally includes, wherein to identify the user proximate to the system, the user sensing module is to use posture or sound analysis to corroborate the identification of the user.

In Example 13, the subject matter of any one or more of Examples 11-12 optionally include, wherein the user is assigned the role of driver.

In Example 14, the subject matter of any one or more of Examples 1-13 optionally include, wherein to identify the user proximate to the system, the user sensing module is to receive user input to set the user whose gaze is to be highlighted.

In Example 15, the subject matter of any one or more of Examples 1-14 optionally include, wherein to identify the user proximate to the system, the user sensing module is to analyze gestures of the user.

In Example 16, the subject matter of any one or more of Examples 1-15 optionally include, wherein to identify the user proximate to the system, the user sensing module is to perform sound analysis to identify the user.

In Example 17, the subject matter of any one or more of Examples 1-16 optionally include, wherein to track the gaze of the user, the gaze tracking module is to: capture a representation of the user; and analyze the representation to determine the gaze of the user.

In Example 18, the subject matter of Example 17 optionally includes, wherein the representation is an optical image and wherein to analyze the representation, the gaze tracking module is to implement facial analysis to determine the gaze of the user.

In Example 19, the subject matter of any one or more of Examples 17-18 optionally include, wherein the representation is a three-dimensional representation and wherein to analyze the representation, the gaze tracking module is to implement morphologic analysis to determine the gaze of the user.

In Example 20, the subject matter of any one or more of Examples 1-19 optionally include, wherein to draw the highlighted area on the display corresponding to the gaze of the user, the presentation module is to: draw a shape on the display; and periodically redraw the shape to track the gaze of the user.

In Example 21, the subject matter of Example 20 optionally includes, wherein to draw the shape, the presentation module is to draw the shape with a fill and a transparency.

In Example 22, the subject matter of any one or more of Examples 20-21 optionally include, wherein to draw the shape, the presentation module is to draw an outline of the shape.

In Example 23, the subject matter of Example 22 optionally includes, wherein the outline of the shape comprises a dashed line.

In Example 24, the subject matter of any one or more of Examples 1-23 optionally include, wherein to draw the highlighted area on the display corresponding to the gaze of the user, the presentation module is to highlight a portion of text being displayed on the display.

In Example 25, the subject matter of Example 24 optionally includes, wherein the portion of text is highlighted based on semantic analysis of the text being displayed on the display.

In Example 26, the subject matter of any one or more of Examples 1-25 optionally include, wherein to draw the highlighted area on the display corresponding to the gaze of the user, the presentation module is to magnify the highlighted area.

In Example 27, the subject matter of any one or more of Examples 1-26 optionally include, wherein to draw the highlighted area on the display corresponding to the gaze of the user, the presentation module is to draw a cursor corresponding to the highlighted area.

In Example 28, the subject matter of any one or more of Examples 1-27 optionally include, wherein to draw the highlighted area on the display corresponding to the gaze of the user, the presentation module is to conditionally activate the highlighted area based on a gesture or voice command of the user.

In Example 29, the subject matter of Example 28 optionally includes, wherein the gesture comprises a pointing motion toward the display by the user.

Example 30 is a method of gaze tracking in a co-located workspace, the method comprising: identifying, by a user device, a user proximate to the user device; tracking a gaze of the user; and drawing a highlighted area on a display of the user device, the highlighted area corresponding to the gaze of the user.

In Example 31, the subject matter of Example 30 optionally includes, wherein the user device comprises a desktop computer.

In Example 32, the subject matter of any one or more of Examples 30-31 optionally include, wherein the user device comprises a mobile computer.

In Example 33, the subject matter of any one or more of Examples 30-32 optionally include, wherein the user proximate to the user device is one of several people proximate to the user device.

In Example 34, the subject matter of any one or more of Examples 30-33 optionally include, wherein the user proximate to the user device is acting in an observer role of the user device, where the observer role is not actively controlling the user device.

In Example 35, the subject matter of any one or more of Examples 30-34 optionally include, wherein the user proximate to the user device is acting in a driver role of the user device.

In Example 36, the subject matter of any one or more of Examples 30-35 optionally include, wherein identifying the user proximate to the user device comprises: capturing an image of the user device and a plurality of people proximate to the user device; and analyzing the image to identify the user.

In Example 37, the subject matter of Example 36 optionally includes, wherein analyzing the image to identify the user comprises: analyzing a gesture or posture of the plurality of people proximate to the user device; and based on the gesture or posture, identifying the user.

In Example 38, the subject matter of Example 37 optionally includes, wherein the gesture or posture indicates that the user is holding or controlling the user device, and wherein identifying the user comprises identifying the user as a driver.

In Example 39, the subject matter of any one or more of Examples 37-38 optionally include, wherein the gesture or posture indicates that the user is looking at the user device, and wherein identifying the user comprises identifying the user as an observer.

In Example 40, the subject matter of any one or more of Examples 36-39 optionally include, wherein analyzing the image to identify the user comprises: determining which person of a plurality of people have their face closest to the display of the user device; and identifying the user as the person associated with the closest face.

In Example 41, the subject matter of Example 40 optionally includes, wherein identifying the user proximate to the user device comprises using posture or sound analysis to corroborate the identification of the user.

In Example 42, the subject matter of any one or more of Examples 40-41 optionally include, wherein the user is assigned the role of driver.

In Example 43, the subject matter of any one or more of Examples 30-42 optionally include, wherein identifying the user proximate to the user device comprises receiving user input to set the user whose gaze is to be highlighted.

In Example 44, the subject matter of any one or more of Examples 30-43 optionally include, wherein identifying the user proximate to the user device comprises analyzing gestures of the user.

In Example 45, the subject matter of any one or more of Examples 30-44 optionally include, wherein identifying the user proximate to the user device comprises performing sound analysis to identify the user.

In Example 46, the subject matter of any one or more of Examples 30-45 optionally include, wherein tracking the gaze of the user comprises: capturing a representation of the user; and analyzing the representation to determine the gaze of the user.

In Example 47, the subject matter of Example 46 optionally includes, wherein the representation is an optical image and wherein analyzing the representation comprises implementing facial analysis to determine the gaze of the user.

In Example 48, the subject matter of any one or more of Examples 46-47 optionally include, wherein the representation is a three-dimensional representation and wherein analyzing the representation comprises implementing morphologic analysis to determine the gaze of the user.

In Example 49, the subject matter of any one or more of Examples 30-48 optionally include, wherein drawing the highlighted area on the display of the user device corresponding to the gaze of the user comprises: drawing a shape on the display of the user device; and periodically redrawing the shape to track the gaze of the user.

In Example 50, the subject matter of Example 49 optionally includes, wherein drawing the shape comprises drawing the shape with a fill and a transparency.

In Example 51, the subject matter of any one or more of Examples 49-50 optionally include, wherein drawing the shape comprises drawing an outline of the shape.

In Example 52, the subject matter of Example 51 optionally includes, wherein the outline of the shape comprises a dashed line.

In Example 53, the subject matter of any one or more of Examples 30-52 optionally include, wherein drawing the highlighted area on the display of the user device corresponding to the gaze of the user comprises highlighting a portion of text being displayed on the display.

In Example 54, the subject matter of Example 53 optionally includes, wherein the portion of text is highlighted based on semantic analysis of the text being displayed on the display.

In Example 55, the subject matter of any one or more of Examples 30-54 optionally include, wherein drawing the highlighted area on the display of the user device corresponding to the gaze of the user comprises magnifying the highlighted area.

In Example 56, the subject matter of any one or more of Examples 30-55 optionally include, wherein drawing the highlighted area on the display corresponding to the gaze of the user comprises drawing a cursor corresponding to the highlighted area.

In Example 57, the subject matter of any one or more of Examples 30-56 optionally include, wherein drawing the highlighted area on the display of the user device corresponding to the gaze of the user comprises conditionally activating the highlighted area based on a gesture or voice command of the user.

In Example 58, the subject matter of Example 57 optionally includes, wherein the gesture comprises a pointing motion toward the display by the user.

In Example 59, the subject matter of any one or more of Examples 30-58 optionally include-58.

In Example 60, the subject matter of any one or more of Examples 30-59 optionally include-58.

Example 61 is a system for gaze tracking in a co-located workspace, the system comprising: a display; a processor subsystem; and a memory including instructions, which when executed by the processor subsystem, cause the processor subsystem to: identify a user proximate to the system; track a gaze of the user; and draw a highlighted area on the display, the highlighted area corresponding to the gaze of the user.

In Example 62, the subject matter of Example 61 optionally includes, wherein the system comprises a desktop computer.

In Example 63, the subject matter of any one or more of Examples 61-62 optionally include, wherein the system comprises a mobile computer.

In Example 64, the subject matter of any one or more of Examples 61-63 optionally include, wherein the user proximate to the system is one of several people proximate to the user device.

In Example 65, the subject matter of any one or more of Examples 61-64 optionally include, wherein the user proximate to the system is acting in an observer role of the system, where the observer role is not actively controlling the system.

In Example 66, the subject matter of any one or more of Examples 61-65 optionally include, wherein the user proximate to the system is acting in a driver role of the system.

In Example 67, the subject matter of any one or more of Examples 61-66 optionally include, wherein the instructions to identify the user proximate to the system comprise instructions to: capture an image of the system and a plurality of people proximate to the system; and analyze the image to identify the user.

In Example 68, the subject matter of Example 67 optionally includes, wherein the instructions to analyze the image to identify the user comprise instructions to: analyze a gesture or posture of the plurality of people proximate to the system; and based on the gesture or posture, identify the user.

In Example 69, the subject matter of Example 68 optionally includes, wherein the gesture or posture indicates that the user is holding or controlling the system, and wherein the instructions to identify the user comprise instructions to identify the user as a driver.

In Example 70, the subject matter of any one or more of Examples 68-69 optionally include, wherein the gesture or posture indicates that the user is looking at the system, and wherein the instructions to identify the user comprise instructions to identify the user as an observer.

In Example 71, the subject matter of any one or more of Examples 67-70 optionally include, wherein the instructions to analyze the image to identify the user comprise instructions to: determine which person of a plurality of people have their face closest to the display; and identify the user as the person associated with the closest face.

In Example 72, the subject matter of Example 71 optionally includes, wherein the instructions to identify the user proximate to the system comprise instructions to use posture or sound analysis to corroborate the identification of the user.

In Example 73, the subject matter of any one or more of Examples 71-72 optionally include, wherein the user is assigned the role of driver.

In Example 74, the subject matter of any one or more of Examples 61-73 optionally include, wherein the instructions to identify the user proximate to the system comprise instructions to receive user input to set the user whose gaze is to be highlighted.

In Example 75, the subject matter of any one or more of Examples 61-74 optionally include, wherein the instructions to identify the user proximate to the system comprise instructions to analyze gestures of the user.

In Example 76, the subject matter of any one or more of Examples 61-75 optionally include, wherein the instructions to identify the user proximate to the system instructions to perform sound analysis to identify the user.

In Example 77, the subject matter of any one or more of Examples 61-76 optionally include, wherein the instructions to track the gaze of the user comprise instructions to: capture a representation of the user; and analyze the representation to determine the gaze of the user.

In Example 78, the subject matter of Example 77 optionally includes, wherein the representation is an optical image and wherein the instructions to analyze the representation comprise instructions to implement facial analysis to determine the gaze of the user.

In Example 79, the subject matter of any one or more of Examples 77-78 optionally include, wherein the representation is a three-dimensional representation and wherein the instructions to analyze the representation comprise instructions to implement morphologic analysis to determine the gaze of the user.

In Example 80, the subject matter of any one or more of Examples 61-79 optionally include, wherein the instructions to draw the highlighted area on the display corresponding to the gaze of the user instructions to: draw a shape on the display; and periodically redraw the shape to track the gaze of the user.

In Example 81, the subject matter of Example 80 optionally includes, wherein the instructions to draw the shape comprise instructions to draw the shape with a fill and a transparency.

In Example 82, the subject matter of any one or more of Examples 80-81 optionally include, wherein the instructions to draw the shape comprise instructions to draw an outline of the shape.

In Example 83, the subject matter of Example 82 optionally includes, wherein the outline of the shape comprises a dashed line.

In Example 84, the subject matter of any one or more of Examples 61-83 optionally include, wherein the instructions to draw the highlighted area on the display corresponding to the gaze of the user comprise instructions to highlight a portion of text being displayed on the display.

In Example 85, the subject matter of Example 84 optionally includes, wherein the portion of text is highlighted based on semantic analysis of the text being displayed on the display.

In Example 86, the subject matter of any one or more of Examples 61-85 optionally include, wherein the instructions to draw the highlighted area on the display corresponding to the gaze of the user instructions to magnify the highlighted area.

In Example 87, the subject matter of any one or more of Examples 61-86 optionally include, wherein to draw the highlighted area on the display corresponding to the gaze of the user, the presentation module is to draw a cursor corresponding to the highlighted area.

In Example 88, the subject matter of any one or more of Examples 61-87 optionally include, wherein the instructions to draw the highlighted area on the display corresponding to the gaze of the user instructions to conditionally activate the highlighted area based on a gesture or voice command of the user.

In Example 89, the subject matter of Example 88 optionally includes, wherein the gesture comprises a pointing motion toward the display by the user.

Example 90 is an apparatus for gaze tracking in a co-located workspace, the apparatus comprising: means for identifying, by a user device, a user proximate to the user device; means for tracking a gaze of the user; and means for drawing a highlighted area on a display of the user device, the highlighted area corresponding to the gaze of the user.

In Example 91, the subject matter of Example 90 optionally includes, wherein the user device comprises a desktop computer.

In Example 92, the subject matter of any one or more of Examples 90-91 optionally include, wherein the user device comprises a mobile computer.

In Example 93, the subject matter of any one or more of Examples 90-92 optionally include, wherein the user proximate to the user device is one of several people proximate to the user device.

In Example 94, the subject matter of any one or more of Examples 90-93 optionally include, wherein the user proximate to the user device is acting in an observer role of the user device, where the observer role is not actively controlling the user device.

In Example 95, the subject matter of any one or more of Examples 90-94 optionally include, wherein the user proximate to the user device is acting in a driver role of the user device.

In Example 96, the subject matter of any one or more of Examples 90-95 optionally include, wherein the means for identifying the user proximate to the user device comprise: means for capturing an image of the user device and a plurality of people proximate to the user device; and means for analyzing the image to identify the user.

In Example 97, the subject matter of Example 96 optionally includes, wherein the means for analyzing the image to identify the user comprise: means for analyzing a gesture or posture of the plurality of people proximate to the user device; and based on the gesture or posture, means for identifying the user.

In Example 98, the subject matter of Example 97 optionally includes, wherein the gesture or posture indicates that the user is holding or controlling the user device, and wherein the means for identifying the user comprise means for identifying the user as a driver.

In Example 99, the subject matter of any one or more of Examples 97-98 optionally include, wherein the gesture or posture indicates that the user is looking at the user device, and wherein the means for identifying the user comprise means for identifying the user as an observer.

In Example 100, the subject matter of any one or more of Examples 96-99 optionally include, wherein the means for analyzing the image to identify the user comprise: means for determining which person of a plurality of people have their face closest to the display of the user device; and means for identifying the user as the person associated with the closest face.

In Example 101, the subject matter of Example 100 optionally includes, wherein the means for identifying the user proximate to the user device comprise means for using posture or sound analysis to corroborate the identification of the user.

In Example 102, the subject matter of any one or more of Examples 100-101 optionally include, wherein the user is assigned the role of driver.

In Example 103, the subject matter of any one or more of Examples 90-102 optionally include, wherein the means for identifying the user proximate to the user device comprise means for receiving user input to set the user whose gaze is to be highlighted.

In Example 104, the subject matter of any one or more of Examples 90-103 optionally include, wherein the means for identifying the user proximate to the user device comprise means for analyzing gestures of the user.

In Example 105, the subject matter of any one or more of Examples 90-104 optionally include, wherein the means for identifying the user proximate to the user device comprise means for performing sound analysis to identify the user.

In Example 106, the subject matter of any one or more of Examples 90-105 optionally include, wherein the means for tracking the gaze of the user comprise: means for capturing a representation of the user; and means for analyzing the representation to determine the gaze of the user.

In Example 107, the subject matter of Example 106 optionally includes, wherein the representation is an optical image and wherein the means for analyzing the representation comprise means for implementing facial analysis to determine the gaze of the user.

In Example 108, the subject matter of any one or more of Examples 106-107 optionally include, wherein the representation is a three-dimensional representation and wherein the means for analyzing the representation comprise means for implementing morphologic analysis to determine the gaze of the user.

In Example 109, the subject matter of any one or more of Examples 90-108 optionally include, wherein the means for drawing the highlighted area on the display of the user device corresponding to the gaze of the user comprise: means for drawing a shape on the display of the user device; and means for periodically redrawing the shape to track the gaze of the user.

In Example 110, the subject matter of Example 109 optionally includes, wherein drawing the shape comprises drawing the shape with a fill and a transparency.

In Example 111, the subject matter of any one or more of Examples 109-110 optionally include, wherein the means for drawing the shape comprise means for drawing an outline of the shape.

In Example 112, the subject matter of Example 111 optionally includes, wherein the outline of the shape comprises a dashed line.

In Example 113, the subject matter of any one or more of Examples 90-112 optionally include, wherein the means for drawing the highlighted area on the display of the user device corresponding to the gaze of the user means for highlighting a portion of text being displayed on the display.

In Example 114, the subject matter of Example 113 optionally includes, wherein the portion of text is highlighted based on semantic analysis of the text being displayed on the display.

In Example 115, the subject matter of any one or more of Examples 90-114 optionally include, wherein the means for drawing the highlighted area on the display of the user device corresponding to the gaze of the user means for magnifying the highlighted area.

In Example 116, the subject matter of any one or more of Examples 90-115 optionally include, wherein the means for drawing the highlighted area on the display corresponding to the gaze of the user comprise means for drawing a cursor corresponding to the highlighted area.

In Example 117, the subject matter of any one or more of Examples 90-116 optionally include, wherein the means for drawing the highlighted area on the display of the user device corresponding to the gaze of the user comprise means for conditionally activating the highlighted area based on a gesture or voice command of the user.

In Example 118, the subject matter of Example 117 optionally includes, wherein the gesture comprises a pointing motion toward the display by the user.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for gaze tracking in a co-located workspace, the system comprising:
   a user sensing circuit to identify a first user and a second user proximate to the system;
   a gaze tracking circuit to track a gaze of the first user and of the second user; and
   a presentation circuit to draw a first highlighted area on a display of the system, the first highlighted area corresponding to the gaze of the first user, wherein to draw the first highlighted area, the presentation circuit is to highlight a portion of text in a document being displayed on the display based on semantic analysis of the text being displayed, the semantic analysis including analysis of document metadata of the document, and to draw a second highlighted area on the display of the system, the second highlighted area corresponding to the gaze of the second user and displayed concurrently with the display of the first highlighted area, the second highlighted area differing from the first highlighted area by at least one of a color or a shape of the second highlighted area.

2. The system of claim 1, wherein the first user proximate to the system is acting in an observer role of the system, where the observer role is not actively controlling the system.

3. The system of claim 1, wherein to identify the first user and the second user proximate to the system, the user sensing circuit is to:
   capture an image of the system and a plurality of people proximate to the system; and
   analyze the image to identify the first user and the second user.

4. The system of claim 3, wherein to analyze the image to identify the first user and the second user, the user sensing circuit is to:
   analyze a gesture or posture of the plurality of people proximate to the system; and
   based on the gesture or posture, identify the first user and the second user.

5. The system of claim 4, wherein the gesture or posture indicates that the first user is holding or controlling the system, and wherein to identify the first user, the user sensing circuit is to identify the first user as a driver.

6. The system of claim 4, wherein the gesture or posture indicates that the first user is looking at the system, and wherein to identify the first user, the user sensing circuit is to identify the first user as an observer.

7. The system of claim 3, wherein to analyze the image to identify the first user, the user sensing circuit is to:
   determine which person of a plurality of people have their face closest to the display; and
   identify the first user as the person associated with the closest face.

8. The system of claim 7, wherein to identify the first user proximate to the system, the user sensing circuit is to use posture or sound analysis to corroborate the identification of the first user.

9. The system of claim 1, wherein to identify the first user proximate to the system, the user sensing circuit is to receive user input to set the first user whose gaze is to be highlighted.

10. The system of claim 1, wherein to identify the first user proximate to the system, the user sensing circuit is to analyze gestures of the first user.

11. The system of claim 1, wherein to track the gaze of the first user and the second user, the gaze tracking circuit is to:
    capture a representation of the first user and the second user; and
    analyze the representation to determine the gaze of the first user and the second user.

12. The system of claim 11, wherein the representation is an optical image and wherein to analyze the representation, the gaze tracking circuit is to implement facial analysis to determine the gaze of the first user and the second user.

13. The system of claim 11, wherein the representation is a three-dimensional representation and wherein to analyze the representation, the gaze tracking circuit is to implement morphologic analysis to determine the gaze of the first user and the second user.

14. A method of gaze tracking in a co-located workspace, the method comprising:
identifying, by a user device, a first user and the second user proximate to the user device;
tracking a gaze of the first user and of the second user;
drawing a first highlighted area on a display of the user device, the first highlighted area corresponding to the gaze of the first user, wherein drawing the first highlighted area comprises highlighting a portion of text in a document being displayed on the display based on semantic analysis of the text being displayed, the semantic analysis including analysis of document metadata of the document; and
drawing a second highlighted area on the display of the user device, the second highlighted area corresponding to the gaze of the second user and displayed concurrently with the display of the first highlighted area, the second highlighted area differing from the first highlighted area by at least one of a color or a shape of the second highlighted area.

15. The method of claim 14, wherein identifying the first user and the second user proximate to the user device comprises:
capturing an image of the user device and a plurality of people proximate to the user device; and
analyzing the image to identify the first user and the second user.

16. The method of claim 15, wherein analyzing the image to identify the first user comprises:
determining which person of a plurality of people have their face closest to the display of the user device; and
identifying the first user as the person associated with the closest face.

17. The method of claim 16, wherein identifying the first user proximate to the user device comprises using posture or sound analysis to corroborate the identification of the first user.

18. The method of claim 16, wherein the first user is assigned the role of driver.

19. The method of claim 14, wherein drawing the highlighted area on the display of the user device corresponding to the gaze of the first user comprises:
drawing a shape on the display of the user device; and
periodically redrawing the shape to track the gaze of the first user.

20. The method of claim 14, wherein the document metadata includes a type of document.

21. The method of claim 14, wherein the document metadata indicates that the document is a code listing and wherein the portion of text is a code block.

22. A system for gaze tracking in a co-located workspace, the system comprising:
a display;
a processor subsystem; and
a memory including instructions, which when executed by the processor subsystem, cause the processor subsystem to:
identify a first user and the second user proximate to the system;
track a gaze of the first user and of the second user; and
draw a first highlighted area on the display, the first highlighted area corresponding to the gaze of the first user, wherein to draw the first highlighted area, the instructions cause the processor subsystem to highlight a portion of text in a document being displayed on the display based on semantic analysis of the text being displayed, the semantic analysis including analysis of document metadata of the document, and draw a second highlighted area on the display, the second highlighted area corresponding to the gaze of the second user and displayed concurrently with the display of the first highlighted area, the second highlighted area differing from the first highlighted area by at least one of a color or a shape of the second highlighted area.

23. The system of claim 22, wherein the instructions to draw the first highlighted area on the display corresponding to the gaze of the first user include instructions to conditionally activate the highlighted area based on a gesture or voice command of the first user.

24. The system of claim 23, wherein the gesture comprises a pointing motion toward the display by the first user.

25. At least one non-transitory machine-readable medium comprising instructions, which when executed by a machine, cause the machine to perform the operations comprising:
identifying, by a user device, a first user and the second user proximate to the user device;
tracking a gaze of the first user and of the second user; and
drawing a first highlighted area on a display of the user device, the first highlighted area corresponding to the gaze of the first user, wherein drawing the first highlighted area comprises highlighting a portion of text in a document being displayed on the display based on semantic analysis of the text being displayed, the semantic analysis including analysis of document metadata of the document, and drawing a second highlighted area on the display of the user device, the second highlighted area corresponding to the gaze of the second user and displayed concurrently with the display of the first highlighted area, the second highlighted area differing from the first highlighted area by at least one of a color or a shape of the second highlighted area.

26. The at least one non-transitory machine-readable medium of claim 25, wherein identifying the first user and the second user proximate to the user device comprises:
capturing an image of the user device and a plurality of people proximate to the user device; and
analyzing the image to identify the first user and the second user.

* * * * *